Oct. 29, 1946.　　　A. J. PEDIGO　　　2,410,232
REFRIGERATING APPARATUS
Filed March 11, 1944　　10 Sheets-Sheet 7

Fig. 12.

Inventor
A. J. Pedigo.
By Wilfred E. Lawson
Attorney

Oct. 29, 1946.   A. J. PEDIGO   2,410,232
REFRIGERATING APPARATUS
Filed March 11, 1944   10 Sheets-Sheet 10

Inventor
A. J. Pedigo.
By Wilfred E. Lawson
Attorney

Patented Oct. 29, 1946

2,410,232

UNITED STATES PATENT OFFICE 2,410,232

REFRIGERATING APPARATUS

Arthur J. Pedigo, Cookeville, Tenn.

Application March 11, 1944, Serial No. 526,021

16 Claims. (Cl. 62—89)

This invention relates generally to the class of refrigeration and pertains particularly to an improved refrigerator structure or unit of the general character disclosed in my prior patents of April 15, 1941, Numbers 2,238,074 and 2,238,284.

A general object of the present invention is to provide a refrigerating apparatus or assembly designed to use both ice and a mechanical refrigerating means for the maintenance within a refrigerator cabinet of a constant temperature level, which is constructed in a single compact unit designed to be inserted into a suitable cabinet for suspension therein and also designed in a novel manner whereby a controlled circulation of air around the refrigerating mediums may be readily had.

Another object of the invention is to provide a refrigerating apparatus employing both ice and mechanical means for maintaining the desired temperature within a cabinet wherein a substantially closed ice chamber is provided and units of the mechanical refrigerating apparatus are inclosed within the ice chamber while other units of the mechanical refrigerating means are disposed within the refrigerator structure but outside the ice inclosing chamber and within an air circulating passage, the lower portion of said chamber and passage being in communication whereby the desired temperature and humidity conditions may be maintained within the food chamber of the refrigerator structure, over which the refrigerating apparatus is suspended.

Still another object of the invention is to provide in a refrigerating apparatus of the character above set forth, a novel grid structure for supporting a melting body of ice, which includes a water circulation coil and transversely extending plates between which the melting body of ice extends downwardly from the ice chamber to form a plurality of ice pillars between which air may circulate, with flange means forming a part of each of the said plates which function to limit the downward movement of the ice between the plates and coil sections, the said plates further being provided with openings or apertures to provide for the more ready passage of air between the ice pillars.

Another object of the invention is to provide a refrigerating apparatus wherein a novel means is employed for absorbing gases and odors from the air within the refrigerator by the discharge of a water vapor or mist into the air to circulate through the air chambers in which both the mechanical and natural refrigerating means are located.

A still further object of the invention is to provide an improved refrigerating apparatus employing both melting ice and mechanical air-chilling or refrigerating units for maintaining a desired temperature level and for bringing to a desired low temperature, water which is introduced into the refrigerated chambers and caused to circulate through such chambers in the form of a mist or vapor to effect the absorption of gases and odors, the temperature of the water so discharged and circulated being reduced several degrees below the temperature of the air in the refrigerating chambers to insure the said absorption of the odors and gases from the air.

Other objects and advantages of the invention will become apparent as the description of the same proceeds and the invention will be best understood from a consideration of the following detailed description taken in connection with the accompanying drawings forming a part of the specification, with the understanding, however, that various changes and modifications may be made in the structure so long as such changes and modifications mark no material departure from the salient features of the invention as expressed in the appended claims.

Referring now more particularly to the drawings wherein like reference characters designate corresponding parts throughout the several views, the reference character C generally designates a cabinet in which food or other material is to be kept at a desired refrigerating temperature. This cabinet is here illustrated as being of the usual domestic type for use in homes in the storage of food or in small commercial establishments for the storage of food products, medicines or other substances which must be kept at a proper low temperature but it is to be understood that the invention is not to be limited to use in a small cabinet of this character but may be of larger size for use in large commercial establishments, the refrigeration apparatus inclosed within the cabinet being, of course, suitably enlarged to obtain the desired refrigeration effect in the larger structure.

The cabinet C is provided with the usual door opening 10 in the lower portion thereof, which is closed by the door 11, and the upper door opening 12, through which the body of ice 13 may be introduced into the refrigeration apparatus ice chamber, such upper opening being closed by the door 14.

Figure 1:
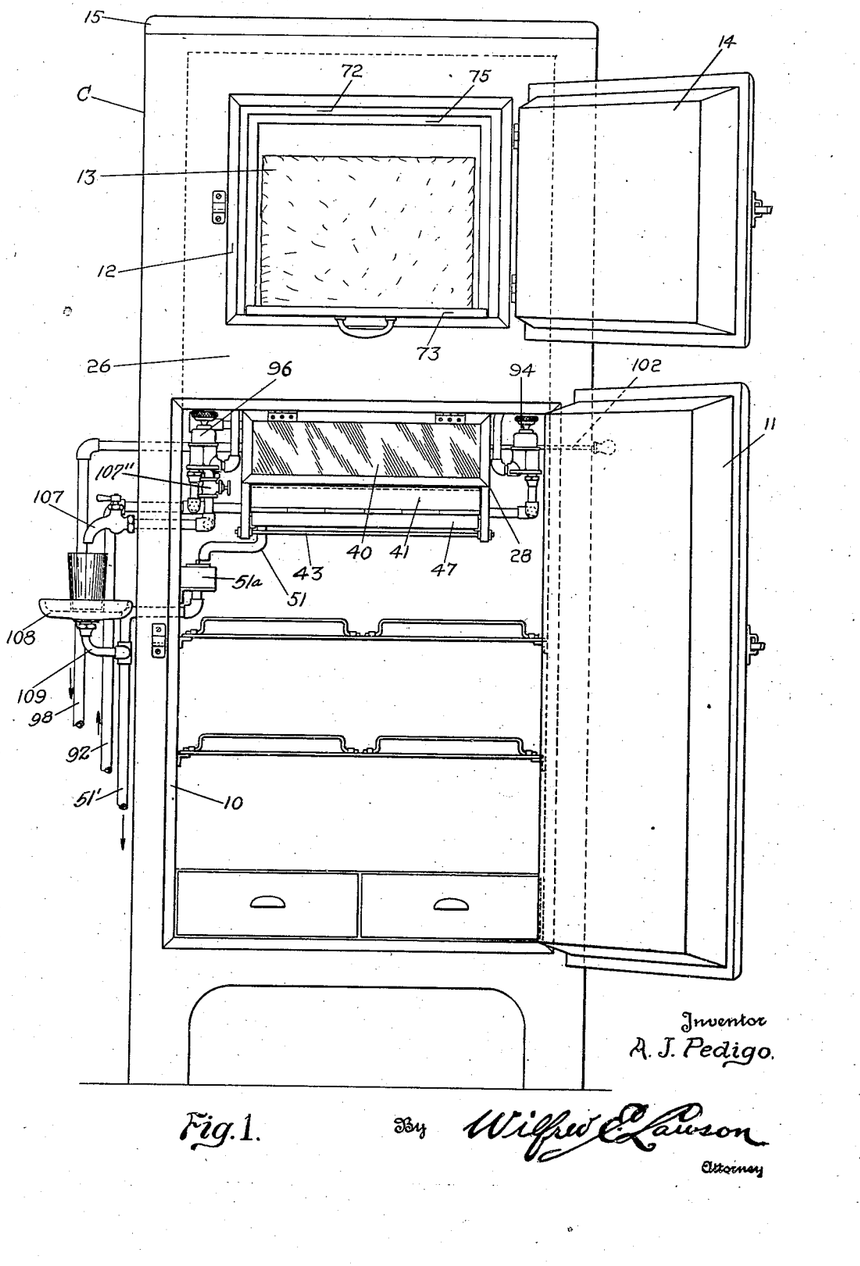
Figure 1 is a view in front elevation of a refrigerator cabinet within the upper portion of which the refrigeration apparatus of the present invention is suspended, a portion of the lower part of such apparatus being shown in front elevation.
Figure 14:
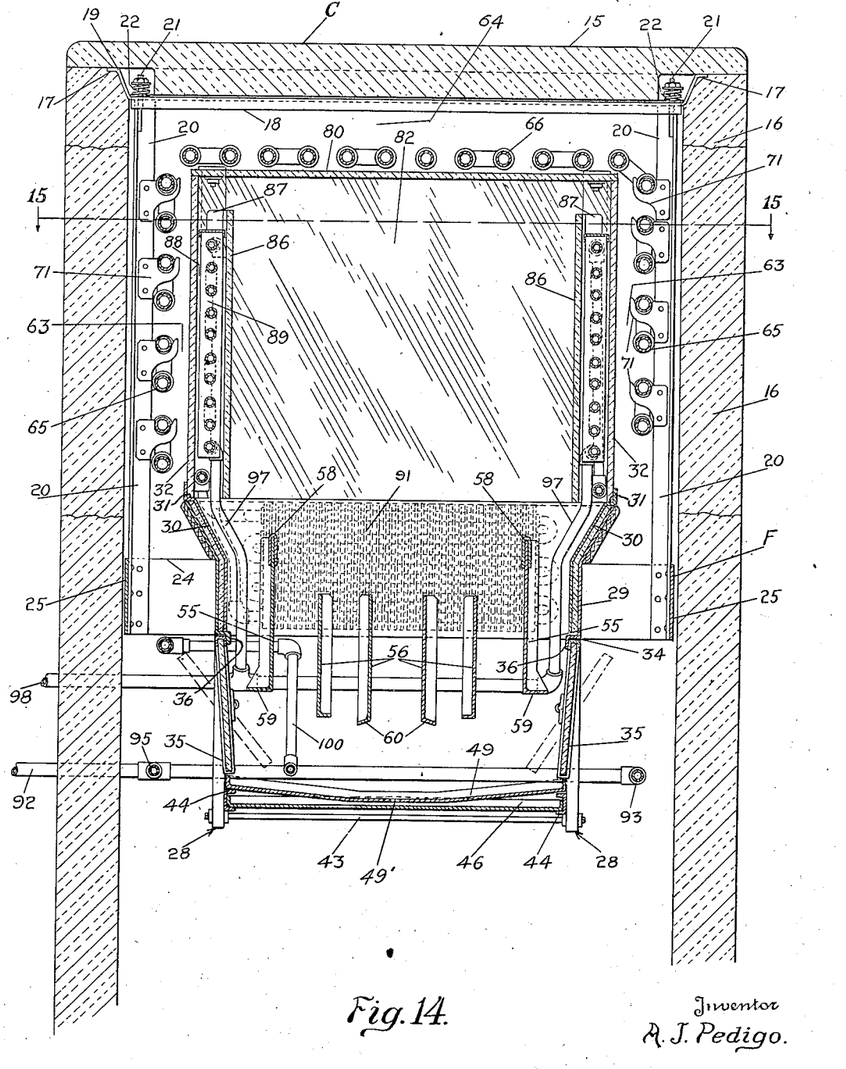
Figure 14 is a vertical section taken substantially on the line 14—14 of Figure 13.

While, of course, the refrigeration apparatus may be installed in the cabinet in any desired manner, it is contemplated that when used in a cabinet of the type shown in Figure 1, the top wall 15 would be removable and the top edges of the side walls 16 would be provided with suitable recesses 17 to receive the transverse apparatus suspending or carrying girders 18 in the manner particularly illustrated in Figure 14.

Figure 13:
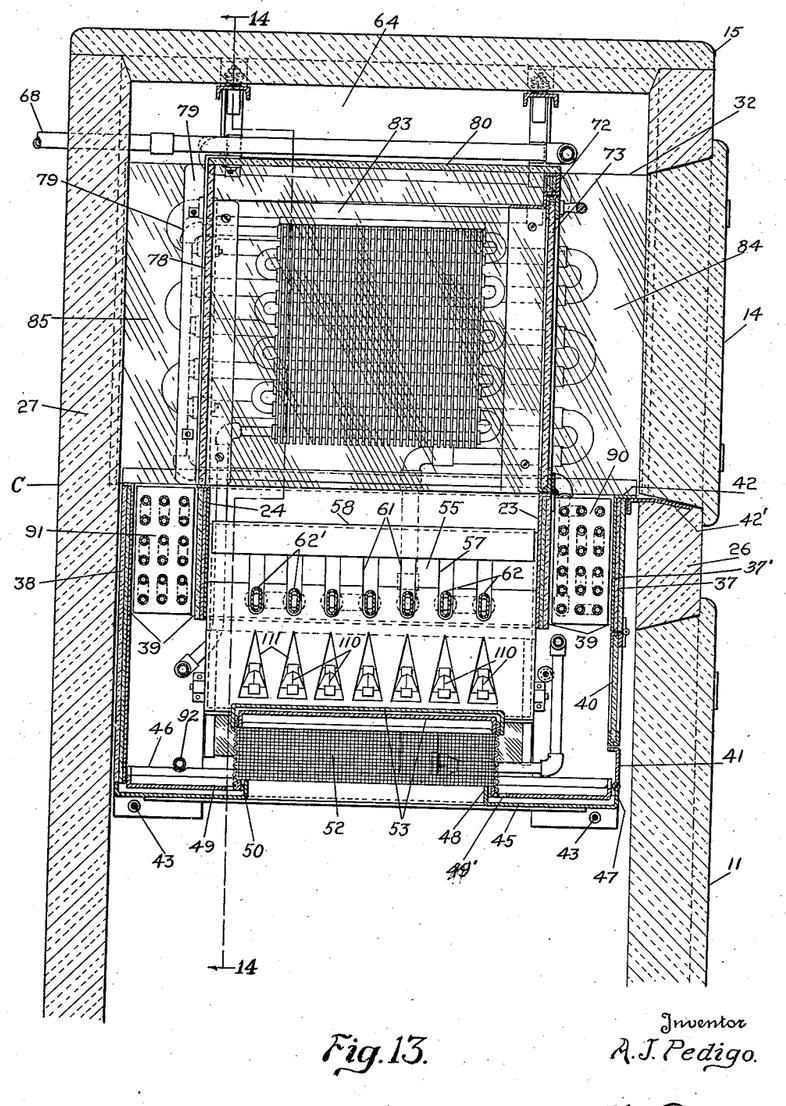
Figure 13 is a vertical section taken substantially on the line 13—13 of Figure 12 with the top wall of the cabinet in place over the refrigerating unit.

The contacting edges of the vertical walls of the cabinet and the top wall 15 are suitably beveled and fitted as shown particularly in Fig. 13 to provide a tight joint when the top wall is in position.

In accordance with the present invention the apparatus carrying or suspending girders 18, which are here shown as being two in number, are formed at their ends to provide the upwardly and longitudinally extending brackets 19 which fit into the recesses 17 in the side walls of the cabinet so that the body of the girder will be disposed at a suitable low elevation to allow for the projection downwardly into the top part of the cabinet of the central portion of the top wall 15 as shown in Figure 14.

Adjacent each end, each girder has depending therefrom a hangar bar or rod 20, from the upper end of which extends the threaded bolt 21 which passes through the girder and is connected with a cushion spring 22 located upon the top of the girder to provide a spring suspension such as is commonly employed in mounting refrigerating units within the cabinets.

Figure 2:
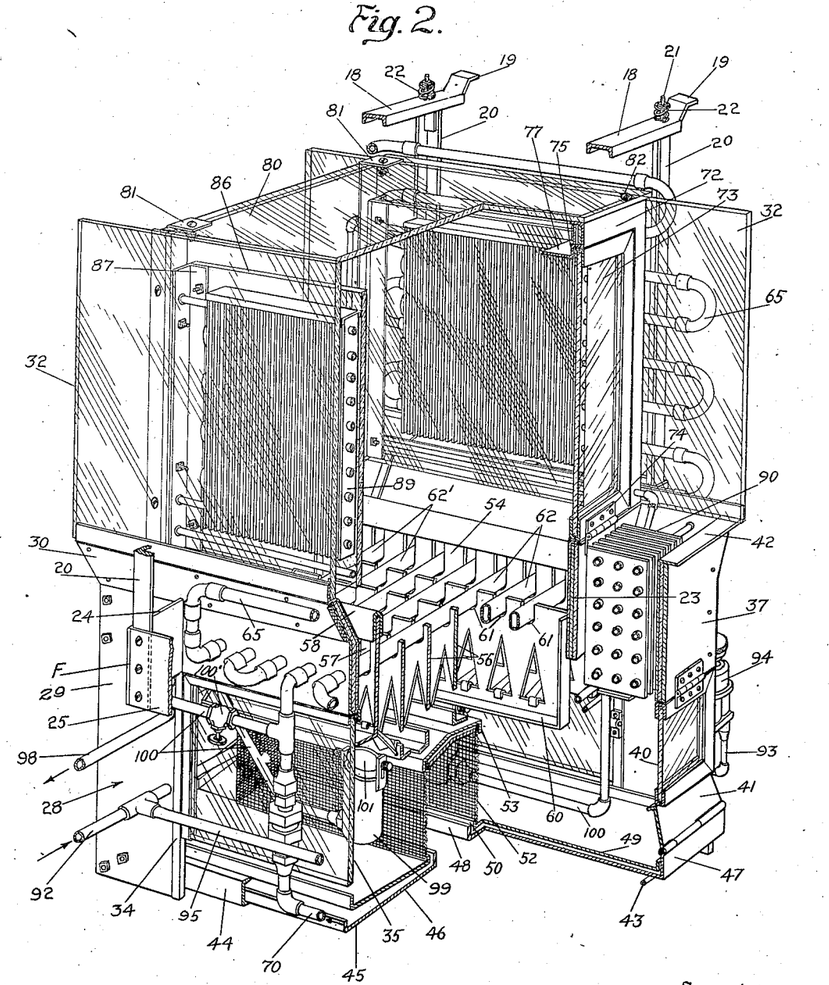
Figure 2 is a view in perspective of the refrigeration apparatus per se parts thereof being removed and parts being in section for a clearer understanding of the structure.
Figure 5:
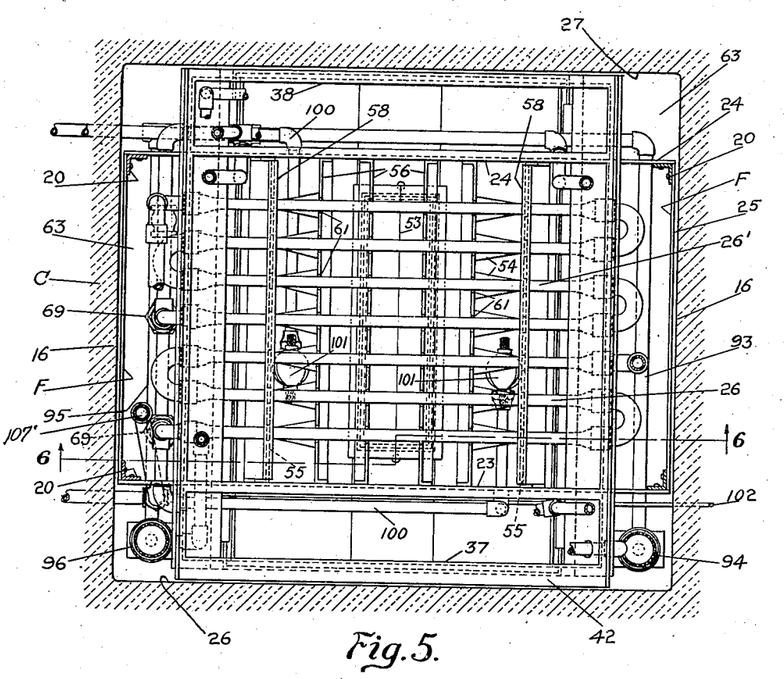
Figure 5 is a horizontal section taken substantially on the line 5—5 of Figure 4.
Figure 6:
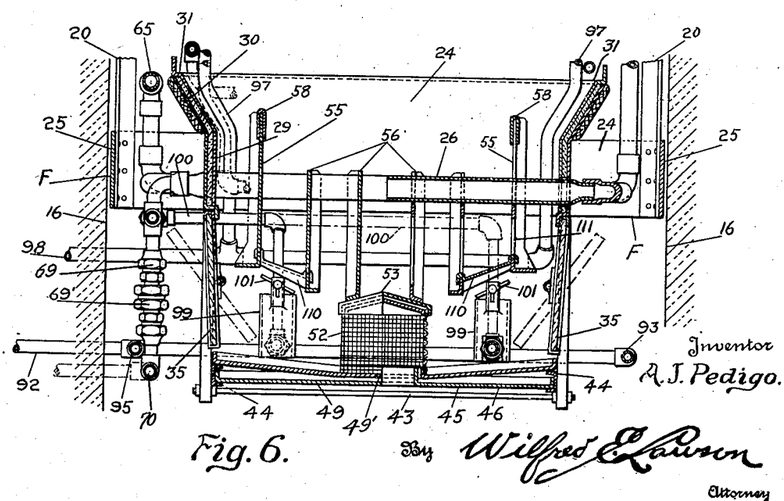
Figure 6 is a vertical section through the lower portion of the refrigeration apparatus and adjacent walls of the cabinet therefor, such section being substantially on the line 6—6 of Figure 5.

The lower ends of the hangars 20 are secured, each in a corner of a rectangular frame generally designated F, Figure 2, and comprising the front and rear wall portions 23 and 24 respectively and the side walls 25. As shown in Figure 5 this frame F has its side walls or plates close to or in contact with the side walls 16 of the refrigerator cabinet whereas the front and rear portions 23 and 24 of the frame are spaced from the front and rear walls, designated respectively 26 and 27, of the refrigerator cabinet, the frame being disposed at the level or in the plane of that portion of the front wall of the cabinet lying between the food chamber and ice chamber doors 11 and 14 respectively, as is best seen in Figure 13.

Each side of the refrigeration apparatus is defined by a vertical wall which is generally designated 28. These side walls are of a length to extend the full depth of the cabinet between the front and rear walls thereof and each side wall 28 comprises a lower wall portion 29 through which extends the front and rear portions 23 and 24 of the suspension frame F as shown in Figure 2.

Above these portions 23 and 24 of the suspension frame, the lower side wall portions 29 are directed obliquely outwardly and upwardly as indicated at 30 and each is horizontally outwardly off-set to form a shoulder 31 upon which rests the upper portion 32 of the side wall, which upper portion is preferably of a suitable transparent non-breakable material, such, for example, as plastic, though any suitable insulation material may also be made use of.

Figure 12:
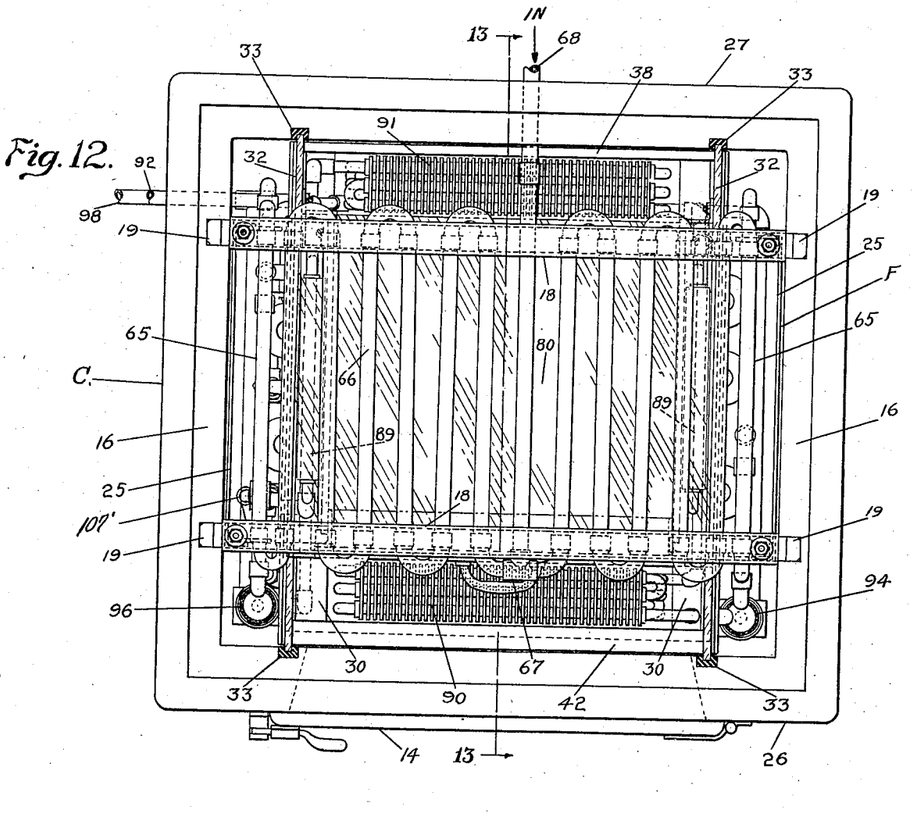
Figure 12 is a top plan view showing the refrigerating apparatus in position within a cabinet, the top of the cabinet being removed.

The upper wall portions 32 extend at their forward and rear edges slightly beyond the lower wall portions and the inner faces of the front and rear walls of the cabinet are provided with the vertical channeled packing strips 33, as shown in Figure 12, in which the projecting front and rear edges of the upper wall portions 32 are slidably engaged.

The lower wall portions 29 of the apparatus are preferably insulated as shown in Figure 2 and each of these wall portions is provided with a door opening 34 in which is suspended for oscillation on a vertical axis, the glass doors 35.

A stop flange 36 is formed along the inner side of each door opening 34 at the top thereof to limit the inward swinging of the top edge of the door 35 as best seen in Figure 14. These doors 35 are controlled to be oscillated simultaneously and to have the top edges swung outwardly as indicated in broken lines in Figure 14, by the control mechanism hereinafter described.

The side walls 28 are connected by front and rear walls 37 and 38 respectively, which are insulated as shown in Figures 2 and 13 and which are spaced respectively from the adjacent frame portions 23 and 24 as best seen in Figure 13, providing the spaces 39 in which certain heat absorption units, hereinafter described, are located.

The front wall 37 extends down below the top edge of the food chamber door opening 10 as shown in Figure 13 and the lower portion of this wall or that portion which is viewable through the door opening 10 includes the window 40 which is pivotally coupled to the upper section of the wall to swing upwardly and outwardly. Below this window and also forming a part of the front wall structure is the pivoted inwardly swinging flap 41.

As shown in Figure 1 the window 40 is accessible through the food chamber door opening 10 so that by swinging the window outwardly and upwardly and swinging the flap portion 41 inwardly and downwardly access may be readily had to the lower part of the refrigeration apparatus below the ice chamber and the ice supporting grid.

The back wall 38 lies in close proximity to the back wall 27 of the cabinet and extends downwardly to the outer or lower section of the hereinafter described drip pan.

Secured to the top of the sill of the ice chamber door opening 12 is a guard or apron plate 42′ which extends inwardly and forms a part of an angle member which is secured to the front wall 37 of the apparatus when the latter is placed in position. Overlying the top edge of the front wall 37 is a flange 42 which is integral with an inner plate 37′ which forms a part of the front wall structure. The angle of which the plate 42′ forms a part extends across the front of the wall 37 and assists in holding the apparatus in position and also covers or closes the upper part of the space between the wall 37 and the front wall 26 of the cabinet to prevent the passage of air upwardly between these two walls. This space between the walls 26 and 37 may be filled, after the apparatus is installed in the cabinet, with a suitable insulation material, not shown.

The side walls 28 are coupled together adjacent the bottom edges thereof, by the transverse tie rods 43, Figures 2, 3, 13 and 14. Above these tie rods the lower portions 29 of the side walls 28 have secured to the inner sides or faces thereof the horizontal guide channels 44 between which is slidably extended from the front of the apparatus the condensation pan 45 which forms a part of the general or entire drip pan unit which is generally designated 46.

While the flap 41 has been described as forming a part of the front wall 37 it is carried by the drip pan unit, being pivotally attached, as shown most clearly in Figures 2 and 13, to the upturned flange formed across the front part of the pan 45, such flange being designated 47.

The central part of the condensation pan 45 is provided with the flanged opening 48 which extends lengthwise of the pan from the front to the rear end and provides a means for the passage downwardly into the underlying food chamber of the cabinet, of cold clean air from the refrigerated spaces of the apparatus.

Figure 3:
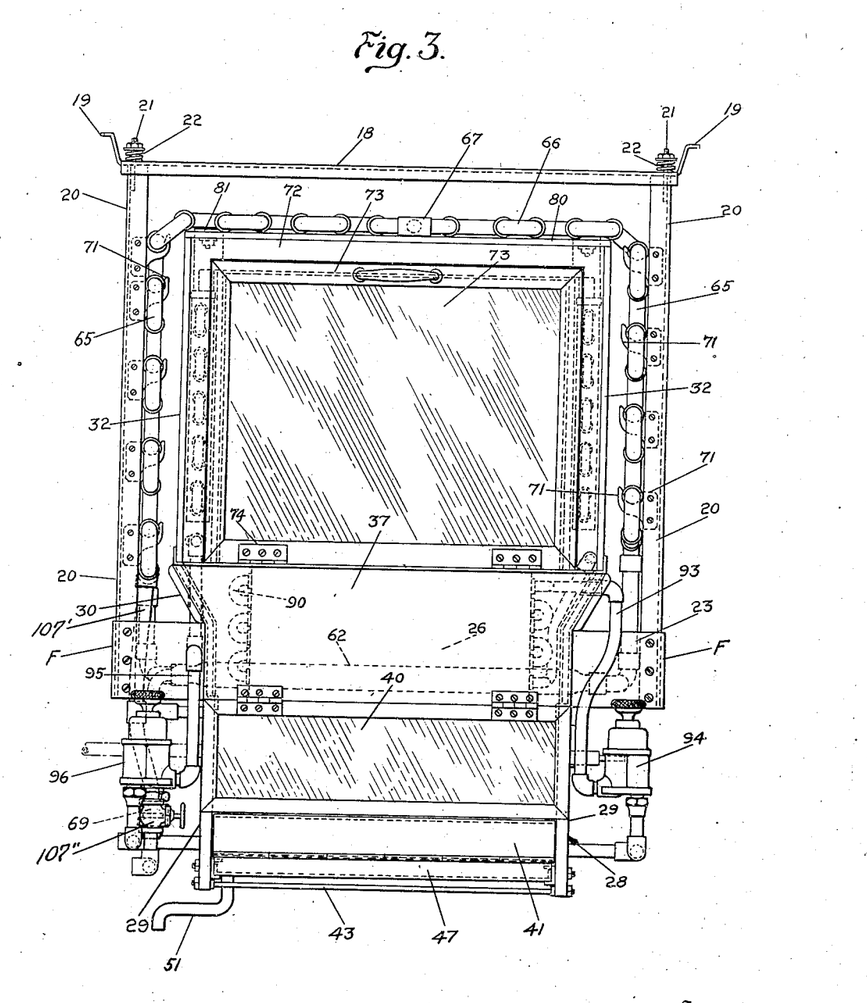
Figure 3 is a view in front elevation of the refrigeration apparatus per se.

Carried by and maintained in spaced relation above the condensate pan 45 is the drip pan 49 which forms a part of the drip pan unit 46 and this drip pan 49 is also provided with a flanged opening 50 which coincides with the opening 48 as shown in Figures 3 and 13. The drip pan 49 is sloped or inclined from the two sides toward the center so that it will drain to the center and the drainage may flow into the underlying condensate pan 45 either through suitable openings such as are indicated in Figure 13 at 49′ or through the opening 50. The fluid will then drain into and be carried off from the drip pan unit 46 by the down-turned spout 51, into a suitable receiver or trap 51a and then into the drain pipe 51′ which passes to the outside of the cabinet as is best shown in Figure 1.

The ventilation or air-passing openings 48 and 50 of the drip pan unit are enclosed by the upstanding screen wall structure 52 which is covered by the vertically spaced hoods 53 which entirely overlie or cover the openings 48—50. These hoods and the screen wall prevent ice chips from falling through the openings into the underlying food chamber and, of course, the hood will also prevent drippings from passing downwardly into the food chamber.

In the area defined by the upper portions of the side wall portions 29 and the front and rear sides or walls 23 and 24 of the frame F, is located the ice grid which is generally designated 54. This grid includes outer bordering plates 55 which are vertically disposed and which extend from front to rear between the walls 23—24 and between these outer or bordering plates 55 are the intermediate vertical plates 56 which are spaced apart and are spaced from the bordering plate 55 as is clearly shown in Figures 2 and 14. The bordering plates 55 extend above the intermediate plates 56 but are not extended above the top edges of the lower wall oblique portions 30. Each of these bordering plates has a series of slots cut downwardly in the top edge thereof as indicated at 57 and each is covered by the reinforcing saddle 58 which closes the upper end of the recesses 57 as best seen in Figure 2.

The ends and bottom edges of the bordering plates 55 are defined by the out-turned flanges 59, the function of which will be hereinafter set forth.

The intermediate plates 56 also have bordering side and bottom flanges 60.

The top edges of the intermediate plates have recesses 61 formed therein, corresponding with and lying transversely of the apparatus with the recesses 57. These transversely aligned recesses of the plates 55—56 receive the transversely extending flattened water coils or coil units or pipes which are assembled in two horizontally disposed groups, the forward group of the pipes being designated 62 and the rear group being designated 62′. As stated these pipes of the coils 62 and 62′ are flattened so that the narrow edges are upward and the coils extend outwardly through the lower portions 29 of the side walls 28 as best seen in Figure 2.

Figure 4:
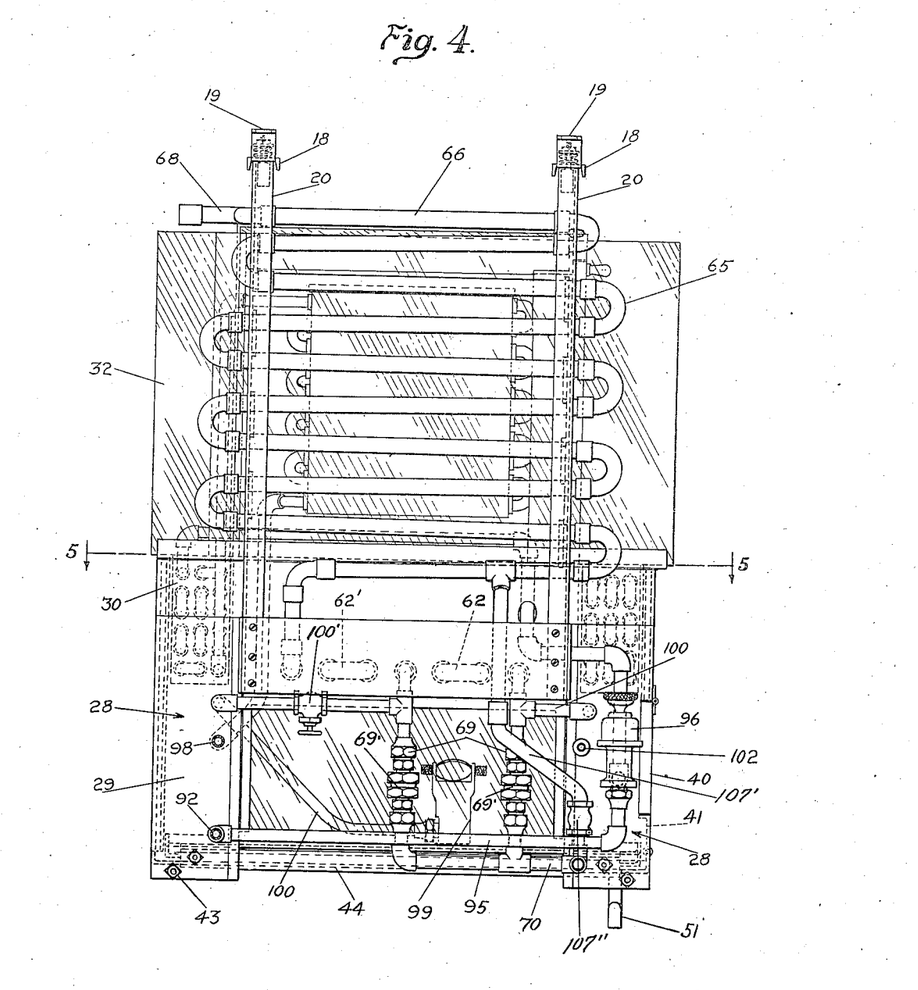
Figure 4 is a view in side elevation of the refrigeration apparatus per se.

The top edges of the upper portions 32 of the side walls 28 are spaced from the cabinet top wall 15 as best seen in Figures 13 and 14, thereby providing the vertical side air passageways 63 and the top air space or passage 64 which extends across the entire underside of the top wall 15 of the cabinet. In each of the side passages 63 there is disposed the vertical water coil 65 while in the top transverse space or passage 64 is disposed a horizontal water coil which is generally designated 66 but which is in two sections as clearly shown in Figure 12, the two sections being joined together at substantially the vertical center of the apparatus for connection with a common water inflow or supply pipe 68. Each section of the top or horizontal coil is connected at its other end with the top of the adjacent side coil 65 and the lower end of each side coil 65 is coupled with an end of a horizontal pipe group 62 or 62'. In the construction here illustrated the pipes of the rear group designated 62' are connected at one end with the left hand vertical coil 65 while the pipes of the forward group designated 62 are connected at one end with the right hand vertical coil 65. The other end of each of the coils formed by the pipe groups 62 and 62' is connected as shown in Figure 4, through a coupling 69 and an outwardly opening check valve 69' to the water outlet or lead-off pipe 70. The purpose of these check valves 69' will be hereinafter described.

It will be seen from the foregoing that the water flows in through the pipe 68 and is divided in the top horizontal coil to pass downwardly through the side coils 65 and through the horizontal pipe groups 62—62' passing out through the check valves 69' to the water lead-off pipe 70. Thus the water coming in from the supply line will have its temperature lowered by the ice surrounding the flattened coils of the pipe groups 62—62' for the purpose hereinafter stated.

For maintaining the vertical coils 65 rigidly in position the hook brackets 71 are secured to the hanger bars 20 as best shown in Figure 14.

Mounted upon the top of the front section or wall 23 of the apparatus supporting frame F and extending between the upper side wall portions 32 is an ice chamber front wall frame 72 in which is fitted the door 73, here illustrated as being of transparent construction, with the exception of the enclosing sash therefor. This door is hingedly attached as indicated at 74 to the top edge of the suspension frame front wall 23, which top edge forms the sill of the opening defined by the frame 72.

The door frame 72 is bordered upon the inner side at the side and top edges of the opening by the stops 75 which merge into the inwardly extending vertical side and horizontal top flanges 76 and 77 respectively. See Figures 2 and 15.

Figure 15:
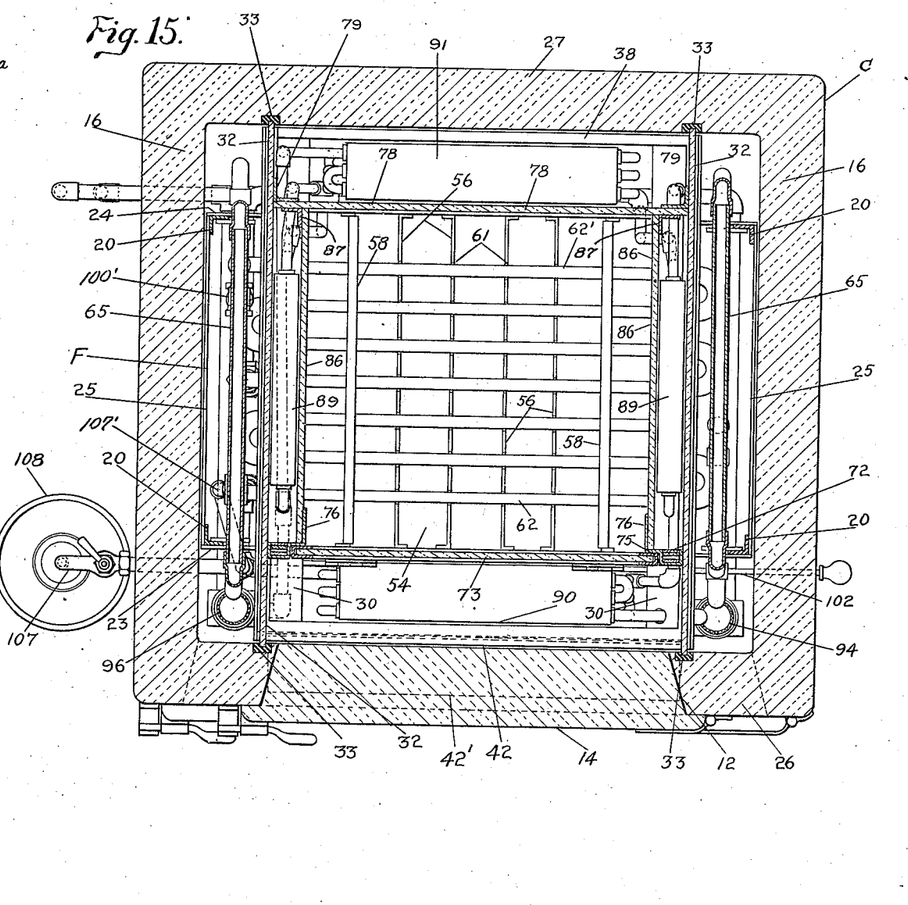
Figure 15 is a horizontal section taken substantially on the line 15—15 of Figure 14.
Figure 16:
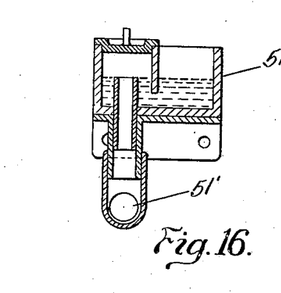
Figure 16 is a view in transverse section of a preferred embodiment of water receiving trap into which drainage is discharged from the drip pans to be carried to the drain lead-off.

In the vertical plane of the rear wall portion 24 of the suspension frame F there is disposed the ice chamber back wall 78 which is here illustrated as being of transparent material. This wall rests upon the top of the frame portion 24 and is secured in position by the vertical angle bars 79, one side of each of which positions against the innerside of the adjacent wall portion 32 while the other side of each angle bar positions against the back or rear side of the wall 78 as shown in Figure 15.

Overlying the area defined by the upper portions 32 of the side walls of the apparatus, the back wall 78 and the frame and door structures 72—73 forming the front wall of the ice chamber, is the ice chamber top wall 80 which rests upon the top edges of the wall portions 32, the wall 78 and the door frame 72 as best seen in Figure 2 and is secured in position by the clamp brackets 81 which are attached to the angle bars 79, and the bolts 82, Figure 2, which pass downwardly through the top wall and may be attached to the inwardly extending horizontal door flange 77. This top wall 80 forms with the side walls 32 a chamber 83 within which the ice block 13 is disposed, being inserted through the door opening defined by the frame 72 and resting upon the ice grid 54, defined more particularly by the plates 55—56 and the transverse water pipes 62—62'.

As will be readily apparent the ice chamber top wall 80 lies beneath the horizontal water coil 66.

In the construction thus far described it will be readily seen that in addition to the vertical side flues or passages 65 which are formed between the outer side walls 16 of the cabinet and the side walls 28 which communicate with the horizontal circulation space 64, there are provided the vertical front and rear air spaces or flues which are designated 84 and 85 respectively, which also communicate with the top horizontal air space 64 as will be readily seen upon reference to Figure 13.

Extending through the depth of the ice chamber in spaced relation with the upper wall portions 32 of the side walls 28 are the vertical partitions 86 which are supported upon the top edges of the front and rear frame wall portions 23 and 24 and in addition are maintained in proper vertical position by the vertical angle bars 87 at the rear of the ice chamber and by the rearwardly extending flanges 76 which form an integral part of the frame 75, as shown in Figure 15. These partition walls 86 do not extend the full height of the ice chamber but are spaced from the top wall 80 thereof as shown in Figure 14 and they provide with the upper portions 32 of the side walls 28 the relatively narrow or shallow vertical passage 88 which houses a freezing or heat absorption coil 89.

Figures 7, 8, 9, 10, 11:
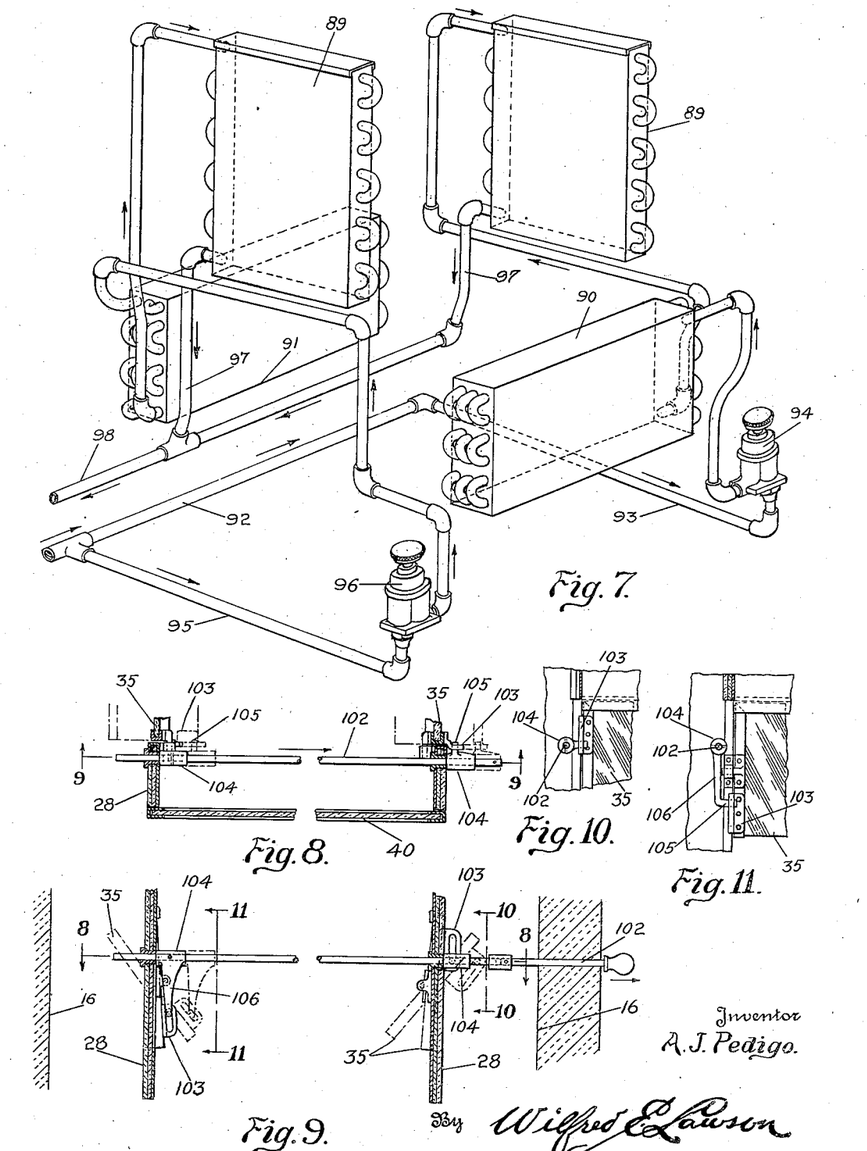
Figure 7 is a diagrammatic view in perspective of that portion of the mechanical refrigerating means which is associated in the apparatus with the ice cabinet, showing the relative positions of the expansion units or absorption units and their connections with the expansion valves and the supply and return pipes for the refrigerating fluid.
Figure 8 is a detail section taken horizontally through the operating mechanism for the air circulation doors located at the sides of the apparatus in the lower portion thereof, by means of which such doors may be simultaneously oscillated to opened or closed position, this section being taken substantially on the line 8—8 of Figure 9.
Figure 9 is a sectional view taken substantially on the line 9—9 of Figure 8.
Figure 10 is a section on the line 10—10 of Figure 9.
Figure 11 is a section on the line 11—11 of Figure 9.

In addition to the coils 62, 62', 65 and 66, there are employed in association with a suitable compressor apparatus, not shown, such as is commonly used in mechanical refrigerators, the four freezing coil units illustrated diagrammatically in Figure 7, two of which, the units 89, have been previously referred to as being disposed in the vertical passages 88 within the ice chamber 82.

The other two units of the mechanical system are designated 90 and 91, the unit 90 being disposed at the front of the apparatus in the lower part of the front vertical air space or passage, between the front wall 37, and the forward side or wall 23 of the frame, while the other unit of the mechanical refrigerating mechanism is designated 91 and is located at the rear of the apparatus in the lower part of the air passageway 85, between the wall 38 and the rear side or portion 24 of the apparatus supporting frame. These front and rear coils 90—91 are in the horizontal plane of that portion of the front wall 26 of the cabinet lying between the doors 11 and 14 and thus the front coil 90 is not exposed to view when the top door 14 is open or through the door opening 10 or the transparent door 40 lying inside this opening.

The mechanical refrigeration coils are connected with the refrigerant supply line 92 in two groups, one group constituting a coil 89 and the coil 90, which are supplied from the branch pipe 93 through the expansion valve 94, which is of standard construction, while the other group includes, of course, the other coil 89 and the rear coil 91 which are supplied through the branch pipe 95 and the expansion valve 96. The several coils are connected by suitable return pipes 97 with the main return line 98.

For the production of the desired mist or vapor in the refrigerating chambers and the air passageways of the mechanism there are provided a pair of mist producing units 99 which are of standard design or construction such as are commonly employed in vegetable markets to maintain a cloud of vapor or mist over and around green vegetables. These units are disposed beneath the ice grid, one at each side of the screen walled central portion of the drip pan unit, between such screen walled portion and the adjacent side doors 35 as shown in Figure 2.

The mist producing units 99 are separately supplied with water from the connections between the couplings 69 and the horizontal coils 62—62' which form a part of the ice grid, as shown in Figures 2 and 4. The connecting pipes between the mist producing units and their respective water supply connections are designated 100 and each has therein a valve 100' for use in the event it becomes necessary to remove a unit 99 for cleaning.

As shown in the last two figures referred to the mist producing units 99 are each adjacent to a door 35, which doors when opened have their top edges moved outwardly as shown in Figure 14 in the vertical passages 63 in which the vertical ice cooled water coils 65 are located. These doors are opened so as to permit air to pass directly to the columns of ice when the sprays are shut off and the mechanical unit is not operating so that it is necessary for the ice to supply all of the refrigeration for the structure.

The mist producing units include the deflector plates 101 which are normally adjusted to deflect the mist outwardly toward the doors. This causes a film of moisture to be formed on the doors, which film functions like the film of water upon the body of ice in the ice chamber, to absorb gases and odors.

The moisture collected upon the doors will drain off from the lower edges thereof into the drip pan as will be readily apparent upon reference to Figure 14.

The oscillation of the doors 35 to open or closed position may be accomplished in any suitable manner but it is preferred that a mechanism be employed by which the doors can be shifted simultaneously by the actuation of a single control such, for example, as the control rod 102 as shown particularly in Figures 1, 5, 8 and 9. Such rod is supported to extend through a side wall of the cabinet as illustrated in Figures 1 and 9 so that it may be conveniently operated.

The rod extends transversely across the major portion of the interior of the cabinet and of the lower part of the refrigeration apparatus, transversely of the doors 35 and across and in close proximity to an end of each as shown particularly in Figures 8, 10 and 11. Each of the doors is here shown as being provided upon the edge adjacent to the rod 102, with a vertically slotted bracket 103, the brackets being upon corresponding sides of the doors. Adjacent to each bracket 103 the rod 102 carries a collar 104 which in turn carries the laterally projecting finger 105 which slidably engages in the adjacent slotted bracket 103.

As shown in Figure 9 one bracket 103 is located substantially upon the horizontal plane of the rod 102 while the other bracket is located a substantial distance below the rod and the collar 104 adjacent to the last mentioned bracket has a drop arm 106 upon which the finger 105 is mounted. From this arrangement it will be readily apparent that when the rod 102 is pulled outwardly corresponding pull will be applied to the brackets 103 which are located one above and the other below the pivot axis for the adjacent door so that the doors will be oppositely oscillated or, in other words, the top portion of each door will be swung outwardly as shown in Figure 14.

While a specific mechanism for actuating the doors 35 has been illustrated and described it is to be understood that the invention is not limited to this particular control means but that any suitable means may be made use of for obtaining the desired action.

As illustrated in Figure 1 there may be connected with the return flow pipe 70, a faucet 107, located upon the outer side of the cabinet so that chilled water may be drawn off from the water coils for drinking and other purposes. A glass tray is mounted beneath the faucet as indicated at 108 and this is coupled by the pipe 109 with the drain pipe 51'.

In order that the chilled water flowing to the faucet 107, may be tempered, if desired, there is provided a shunt or by-pass pipe 107' which leads from the lower end of the adjacent side coil 65 to the pipe 70 between the check valves 69' and the faucet as is illustrated in Figures 1 and 4. This pipe 107' has the valve 107" therein so that the flow of water from the coil 65 into the line leading to the faucet may be increased or completely shut off as desired. Since the water flowing in through the connection or lead-in pipe 68, to the side coils 65, would come from an outside source such as a city water supply, the temperature of this inflowing water would be considerably higher than the temperature after it has passed through the horizontal pipes 62—62' which are adjacent to or in direct contact with the ice and are chilled by the ice. Since the water passing through the coils 62—62' would be close to the freezing point it will be appreciated that it might be considered by some as too cold to drink therefore the temperature could be raised by opening the valve 107" to permit some of the water of a higher temperature to mix with the chilled water as the latter flows to the faucet 107.

The desired gas and odor absorbing action obtained by the use of the water vapor or mist results from the lowering of the temperature of the water leading to the sprays, as near as possible to the temperature of the melting ice. Since the temperature of the air being circulated in the refrigerator is higher than the temperature of the water issuing from the spray, the water becomes an absorbent to function in the manner stated. The temperature difference between the sprayed water and the air within the refrigerator may be from 4° to 8° as it is desirable that there be maintained in the refrigerator a temperature of around 42° for the most satisfactory results.

The purpose of the valves 69' is to prevent the water passing from either the coil 62 or the coil 62' back up through the pipe line 100 for the adjacent spray unit in the event that the adjacent coil becomes clogged. In other words, the check valves 69' prevent the reverse flow of water through them to the adjacent spray units.

For the purpose of bracing and strengthening the intermediate and border plates of the ice supporting grid there are provided the fins 110 which are connected in the openings 111, at the bottom edges thereof, formed in the partition and border plates to facilitate the movement of air laterally beneath the ice and between the columns thereof which will be formed by the melting of the ice around the supporting plates and the transverse pipes 62—62'. These fins are longitudinally channeled and have the ridges directed upwardly so that water may readily drain therefrom and they may also serve the additional function of supporting the ice to limit the downward movement in coaction with the flanges formed at the bottom edges of the plates 55 and 56. The fins also serve to increase the melting surface of the ice through their contact therewith.

As will be readily apparent when food stuffs or other warm articles are placed in the lower part of the cabinet beneath the refrigeration apparatus, air currents will be set up which will move upwardly through the outside passages 63 and the front and rear passages 84 and 85 while oppositely moving cold air will flow downwardly from the mechanically refrigerated coil beneath the ice block supported in the ice chamber upon the grid and then pass downwardly through the central opening of the drip pan to refrigerate the material lying beneath the apparatus. Such air in passing between the ice block supporting plate and in flowing over the adjacent surfaces of the ice body will become humidified and will also give up to the melting ice any odors which may have arisen from the food stuffs.

The correct operation of the present refrigerating apparatus is dependent, of course, upon both the mechanical unit and the ice block in the ice chamber. If the mechanical unit should, for any reason, fail to function then it would no longer be necessary to operate the sprays because the ice would begin to melt and the absorbing effect would be carried on by the melting ice. For this reason the valves 100' are provided in the pipe lines 100 leading to the sprays, as well as for the purpose of shutting off the flow of water to either spray if it should become necessary to remove the spray unit for cleaning, as previously stated.

While no illustration has been made of insulation around any of the pipes, it is contemplated to insulate the pipes leading from the coil sections or units 62—62' to the spray units. Since the use of insulation may be employed without invention, wherever desired, it is not thought necessary to show such insulation around the pipes 100 although it is understood that such pipes may be so covered if desired.

In addition to the foregoing actions and benefits derived from the use of the ice block in the chamber with the mechanically refrigerated unit the additional advantage is had, as set forth in my prior patent, of maintaining an even temperature at all times in the cabinet and of causing the ice block to last longer than it would normally do due to the presence adjacent thereto of the mechanical refrigerating units.

I claim:

1. A refrigeration apparatus comprising, in combination with a casing, a horizontally disposed frame, hangers for suspending said frame in the casing, vertical spaced parallel walls mounted upon said frame and formed to connect between front and rear walls of the casing, the casing having a door controlled opening leading through the front wall into the space between the vertical walls, said vertical walls being spaced from the adjacent side walls of the casing to form vertical side air flues and being spaced from the top wall of the casing to form a horizontal air space, transverse walls connecting between said side walls and spaced from the front and rear walls of the casing to form vertical front and rear air flues, a top wall connecting the top edges of said spaced vertical walls and said transverse walls and forming therewith an ice chamber, a door controlled opening for the ice chamber through the said transverse wall adjacent to the first mentioned opening, means forming an ice supporting grid in the lower part of the ice chamber, said grid including a transverse water conducting pipe, water coils disposed in the first mentioned air flues and in the said horizontal air space and connected in series with the water pipes forming a part of said grid, means for connecting a source of water supply to said pipes and coils for circulation therethrough, a mechanical heat absorption unit in said front and rear air flues, and a mechanical heat absorption unit within the ice chamber.

2. A refrigeration apparatus as set forth in claim 1, with means located beneath the said ice supporting grid for creating a water mist.

3. A refrigeration apparatus as set forth in claim 1, with a drip pan unit underlying and spaced from said ice supporting grid, and units supported between the drip pan unit and the ice supporting grid for creating a water mist.

4. A refrigeration apparatus comprising in combination with a cabinet having vertical side walls, a horizontally disposed frame supported in the cabinet, a pair of spaced vertical side walls supported by said frame in relation with the stated spaced cabinet side walls and extending from the front to the rear cabinet walls, said spaced walls terminating short of the cabinet top wall, means connected with said spaced walls forming an ice chamber which is open upon the bottom side only, means in the open bottom side of the ice chamber for supporting a body of ice, said ice body supporting means including means for limiting the downward movement of an ice body as the same melts and further including water coil pipes between which portions of the melting ice extend downwardly, said ice chamber being spaced at its front and rear sides from the front and rear walls of the cabinet, mechanical heat absorption units disposed in the space between the front and rear walls of the cabinet and the front and rear walls of the ice chamber, and mechanical heat absorption units disposed within the ice chamber.

5. A refrigeration apparatus as set forth in claim 4, with a water mist forming means disposed beneath the ice supporting means adjacent each of the said spaced vertical side walls, within the area defined by said walls together with the front and rear walls of the ice chamber and above the lowermost edges of the walls defining such area, a door in the lower part of each of the said vertical walls beneath the level of the ice supporting means, and means for opening said doors for the passage of air therethrough.

6. A refrigeration apparatus comprising, the combination with a cabinet, of a horizontally disposed rectangular frame supported in the cabinet, means supported upon said frame forming with the side, front and rear walls of the cabinet, vertical side air flues and front and rear air flues communicating with a top horizontal air space, means coacting with the stated flue forming means to provide an ice chamber open only at its bottom, an ice supporting means in the lower open side of the ice chamber comprising a series of vertically disposed spaced plates and a plurality of water pipes perpendicular to the plates and forming a water coil, means for supplying water to the coils for circulation therethrough, means connected with the lower edges of the plates for limiting the downward movement of a melting ice body, a mechanical refrigerating means in each of the second mentioned vertical flues, and a mechanical refrigerating means within the ice chamber.

7. A refrigeration structure as set forth in claim 6, in which the mechanical refrigerating means within the ice chamber comprises two vertically arranged coil units disposed at opposite sides of the chamber, and means adjacent each of the said two opposite sides of the ice chamber and spaced therefrom forming a space opening at its top and bottom into the ice chamber within which a mechanical refrigerating unit is disposed.

8. A refrigeration apparatus comprising in combination with a cabinet having side, front and rear walls, a pair of spaced vertical walls supported within the cabinet between the front and rear walls thereof and spaced from the side walls to provide vertical air flues, said spaced walls being spaced at their top edges from the top of the cabinet, transverse front and rear walls connecting the lower halves of the spaced walls, transverse walls positioned inwardly from the front and rear cabinet walls and connecting the said vertical walls and extending downwardly from the top edges of the vertical walls to a plane below the top edges of the first mentioned transverse walls, the first mentioned transverse walls being spaced from the inwardly spaced transverse walls to provide vertical air flues, a top wall connected with the top edges of the vertical walls and the top edges of the inwardly spaced transverse walls and forming with the vertical walls and the inwardly spaced walls an ice chamber, a door controlled opening in that inwardly spaced transverse wall adjacent the cabinet front wall, facilitating the introduction of ice into the ice chamber, an ice supporting grid in the bottom part of the ice chamber and including vertical spaced plates and spaced parallel members extending transversely of the plates, said vertically spaced plates having flanges at their lower edges for limiting the downward movement of melting ice between the plates and the transverse members, a drip pan joined to the bottom edges of the vertical walls and of the first mentioned transverse walls and covering the area defined by such walls, the drip pan being in vertically spaced relation with the flanged lower edges of said plates, said drip pan having a central air opening therethrough, a mechanical refrigerating unit within the vertical flues formed between the first mentioned transverse walls and the inwardly spaced transverse walls, and a mechanical refrigerating unit disposed within the ice chamber in a plane above the ice supporting means.

9. A refrigeration apparatus as set forth in claim 8, with a water mist forming means disposed in the space between the ice supporting means and the drip pan and within the area defined by the vertical walls and the inwardly spaced transverse walls.

10. A refrigeration apparatus as set forth in claim 8, with a water mist forming means disposed within the space between the ice supporting means and the drip pan and within the area defined by the vertical walls and the inwardly spaced transverse walls, and a swinging door in the lower part of each vertical wall between the levels of the ice supporting means and the drip pan, and means for oscillating said doors from outside the cabinet for opening and closing the doors.

11. A refrigeration apparatus as set forth in claim 4, with transverse front and rear walls connected between the said spaced vertical walls through substantially the lower halves of the said spaced walls and in spaced relation with the front and rear walls of the ice chamber, a drip pan unit connecting and closing the area defined by the bottom edges of the spaced vertical walls and the transverse walls, said drip pan unit having a central opening, a drip guard overlying said central opening and spaced from the drip pan unit, and water mist forming means disposed beneath the ice supporting means at each side of said drip pan opening and constructed and arranged to discharge a water mist laterally upwardly away from said opening.

12. In a refrigeration apparatus, the combination with a cabinet having vertical side walls and a removable top wall, of a pair of girder members removably supported at their ends upon the top edges of two opposite side walls of the cabinet to extend transversely thereof beneath the top wall, said top wall maintaining said girder members in position, hanger members connected with the girder members and extending downwardly in said cabinet, a frame supported by the hanger members horizontally in the cabinet, and an ice supporting refrigeration chamber connected with said frame and suspended by the girder members and hanger members within the cabinet.

13. The combination as set forth in claim 12, in which said ice carrying chamber is of a width with respect to said cabinet to have two opposite walls in spaced relation with adjacent walls of the cabinet to form vertical air flues, bracket members carried by adjacent pairs of the hanger members, and fluid circulation coils connected with said bracket members for support by the hanger members within said flues.

14. A refrigeration apparatus as set forth in claim 13, in which the said means forming the stops comprises lateral flanges formed integral with the lower edges of the plates, and members extending across between and joining the lower portions of adjacent plates.

15. A refrigeration apparatus of the character stated, comprising a cabinet having a wall provided with a door controlled opening, a unit supported within the cabinet and formed to provide an ice chamber, the ice chamber having a wall provided with a door controlled opening in alignment with the first opening, said chamber having a width and depth materially less than the inside width and depth of the cabinet whereby vertical air flues are provided, a drip pan unit forming a wall across the lower part of the unit of which the ice chamber forms a part, an ice supporting grid in the lower part of the ice chamber and spaced from said drip pan unit, water mist forming means disposed between the drip pan unit and the ice supporting grid, and oscillatable doors in opposite walls of the units of which the ice chamber forms a part, between the drip pan unit and the ice supporting grid.

16. A refrigeration apparatus of the character stated in claim 15, in which said oscillatable doors are adapted to swing the bottom edges thereof inwardly to a position above the drip pan unit, on horizontal axes disposed substantially midway between the top and bottom edges of such doors whereby drainage of moisture from the inner sides of the doors will be upon the drip pan unit when such oscillatable doors are in open position.

ARTHUR J. PEDIGO.